Jan. 15, 1963  A. P. IANUZZI  3,073,155
FORCE MEASURING DEVICE
Filed July 3, 1959  2 Sheets-Sheet 2

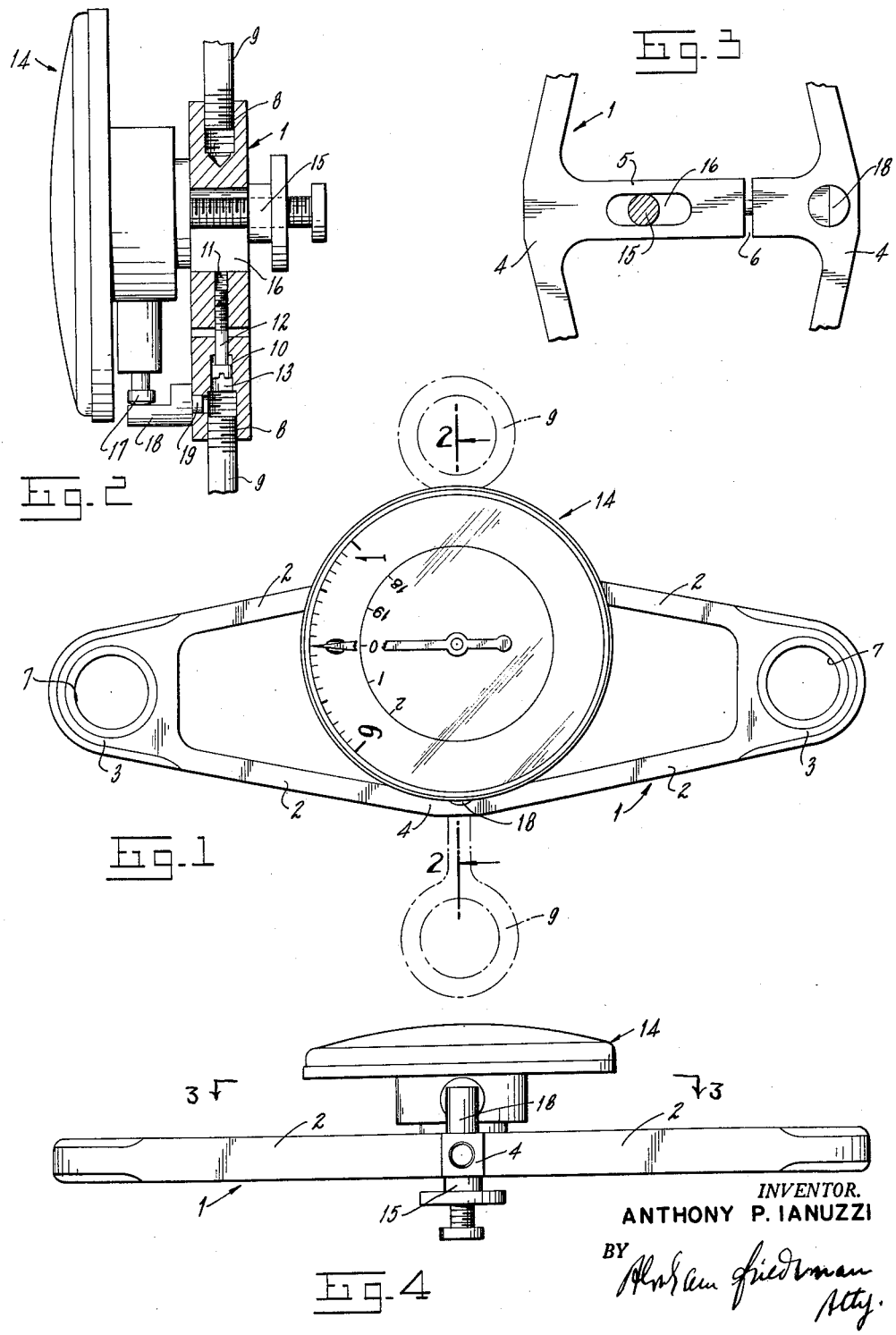

INVENTOR.
ANTHONY P. IANUZZI
BY
Abraham Friedman
Atty

United States Patent Office 3,073,155
Patented Jan. 15, 1963

3,073,155
FORCE MEASURING DEVICE
Anthony P. Ianuzzi, 82—14 Austin St.,
Kew Gardens, N.Y.
Filed July 3, 1959, Ser. No. 824,880
4 Claims. (Cl. 73—141)

This invention relates to force measuring devices and more particularly to force measuring devices utilizing a spring balancing member.

Spring balances are well known in the arts and have been employed for many years as force or weight measuring devices. However, a number of limitations are frequently encountered among the devices heretofore available. Thus, one common difficulty is that the helical spring member common to many of such balances tends to go out of calibration with use. Another disadvantage has been that spring balances employing helical springs become quite cumbersome and unwieldy when they are made to measure large forces. To overcome this problem, some spring balances have been provided with gear systems intended to permit the use of small springs for the measurement of such forces. However, spring balances so designed necessarily suffer from the excessive friction and backlash common to all gear and lever systems. In recognition of these problems, cantilever springs have been suggested as return members because they overcome a number of the objections to helical springs such as their tendency to lose calibration and the difficulty of obtaining units capable of measuring large forces without cumbersome gearing or levering. Nevertheless, the simple cantilever suffers from the disadvantage that its load deflection curve is non-linear and thereby requires a non-linear calibration or some compensating mechanism which has the same tendency as the gear and lever systems to introduce frictional losses and to complicate the construction and operation of the spring balance.

It is an object of the present invention to provide an improved force measuring device which will resist any tendency to go out of calibration.

Another object of the invention is to provide a compact force measuring device which is capable of measuring large forces in a direct manner.

A further object of the invention is to provide such a device which operates without the necessity of employing gear or lever systems.

A further object of the invention is to provide an improved cantilever spring balance which has a linear load deflection curve.

A still further object of the invention is to provide an improved force measuring device of rugged and simple construction.

Other and more specific objects of the present invention will be apparent from the following description as read in connection with the accompanying drawings.

The invention described herein achieves the foregoing objects by an ingenious arrangement of cantilever springs which provides a unitary spring member with a linear load deflection characteristic of high inherent range capability and which has the same tendency to stability in calibration which is attributed to cantilever spring balances. This invention consists in its essence of a system of integrally connected cantilever springs characterized by a deflection across two points in the system in proportion to the load applied thereon. In the preferred form of the invention, the system of interconnected cantilever springs comprises four straight members connected together at the ends to form a rhombic structure. As is hereinafter shown, the deflection across one diagonal of the system is proportional to the load applied across either diagonal thereof. This being the case, the load is determined by means of a conventional deflection responsive device which communicates with the said deflection and translates same into appropriate units of deflection or force, as desired.

In the accompanying drawings:

FIGURE 1 is a plan view of one preferred embodiment of the invention;

FIGURE 2 is a partial cross-sectional view taken about the line 2—2 of FIGURE 1 and showing the means of attachment of the deflection responsive device;

FIGURE 3 is a view taken along the line 3—3 of FIGURE 4, the body of said deflection responsive device being omitted from this view;

FIGURE 4 is a bottom view of the form of the invention depicted in FIGURE 1;

Figure 5:
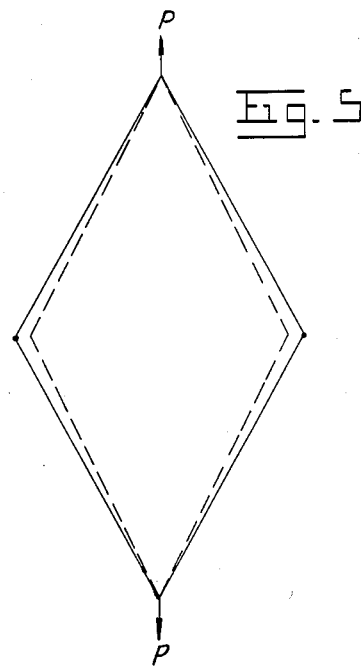
Figure 6:
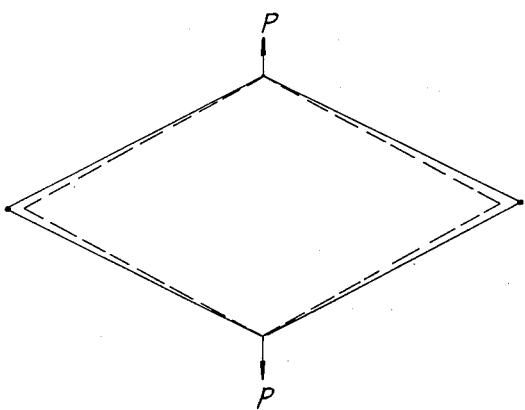
Figure 7:
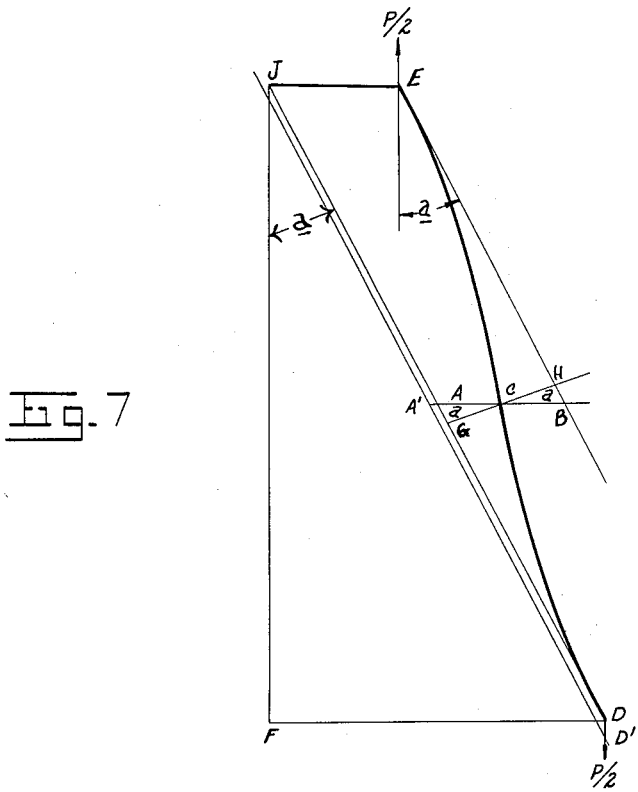

FIGURES 5, 6 and 7 refer to the analysis of the load deflection characteristics of the system of cantilevers given hereinafter, and are discussed in detail in the treatment thereof.

The device comprises a rhombic member, generally designated by the numeral 1, which is made of an elastic material such as a high-grade steel, said member consisting of four straight cantilever springs 2, which are joined at the ends to the eyehole frame portions 3 and to the ends of the diagonal portion 5 at the corner portions 4. The diagonal member 5 is cut through at the point 6 to permit the inward movement of the corner portions 4 under the action of the load. The width of the cut at 6 limits the range of deflection of the springs in the inward direction. A cap screw 12 is secured across the cut at 6, the said cap screw being threadedly received in the tapped hole 11 and the cap 10 being captivated in the shouldered hole 13, thereby restricting to a limited amount any outward motion along the diagonal member 5. A dial indicator 14 is fastened by means of the screw 15 through the slot 16 in the diagonal member 5. The sensing foot 17 of the dial indicator 14 rests against the L-shaped anvil member 18 which is affixed by means of the pin 19 to the diagonal member 5 on the side of the cut at 6 opposite the side in which the slot 16 mounting the indicator 14 is located. With this arrangement, the readings of the dial indicator 14 reflect the displacement of the corner portions 4 with respect to each other. The ends of the diagonal member 5 are equipped with threaded holes 8 into which eyebolts 9 may be threadedly received.

The rhombic spring system is shown diagrammatically in FIGURE 5 wherein the letter P represents a force applied to the eyeholes 7 of FIGURE 1, with a consequent displacement of the corner portions 4, represented in FIGURE 5 by the letter X, to the points X'. This deflection causes the anvil member 18 to displace the sensing foot 17 of the indicator 14 and is shown on the dial of the indicator as a deflection in the inward direction which is a measure of the load applied across the eyeholes 7. Alternatively, eyebolts 9 may be threaded into the holes 8 and a force applied to the springs across the eyebolts 9, as shown diagrammatically in FIGURE 6 wherein the letter P represents the force so applied to the rhombic spring system with a consequent displacement of the eyehole frame portions 3, represented in FIGURE 6 by the letter Y, to the points Y'. Such force causes the diagonal of the rhombic member to lengthen and the corner portions 4 to be displaced away from each other which, in turn, is indicated on the dial indicator 14 as a movement in the direction opposite to that caused by the load applied across the eyeholes 7.

It should be noted that on account of the geometry involved the displacement deflection relationship is different for the two modes of loading. To analyze the relationship between the load applied to the force measuring device and the deflection indicated on the dial deflection indicator, the theory of deflection of cantilever beams may be applied. The four legs of the spring member are so arranged that each pair of legs carries half the load across the member. For example, in the case of loading when the force is applied across the eyeholes 7, one-half of the load is carried in the left-hand pair of springs shown diagrammatically in FIGURE 5 and one-half in the right-hand pair. Figure 7 shows one of the springs ED displaced by loading from its unloaded position JD, and the manner in which the load is applied to it. The loads P/2 may be resolved into a couple which has the tendency to twist the cantilever and a force along the cantilever spring which tends to elongate it. The deflection caused by the moment of the couple will be considered first. This may be assumed to be equally divided on the half beams CE and CD to cause simple cantilever deflections. The sum of these deflections will be the deflection of the entire spring ED. It should be noted that the analysis for one spring cantilever will suffice since the four are symmetrically equivalent in the system. The linear deflection of a cantilever beam with a couple applied to its free end is, through small angular displacements of the beam, proportional to the moment and hence, the linear deflections may be found once the applied moment is known.

It is assumed that the angle $a$ will remain substantially constant during the loading over the design range of the device and the stops hereinbefore described are intended to limit the range of the device so that this is so. As a consequence, the moment arm FD of the couple remains substantially constant, and therefore, the moments applied to the half beams CE and CD are proportional to the applied load P. It was stated that through small angular displacements the linear deflection of a cantilever beam loaded by a couple on its free end is proportional to the applied moment and since the applied moment is proportional to the load, it follows that through such angular displacements the deflections GC and CH of the half beams CE and CD are proportional to the load P. Since the angle $a$ is substantially constant, the horizontal deflections AC and CB must be proportional to the displacements GC and CH and hence, proportional to the applied load P, and since the sum of these represents the horizontal displacement EJ along the diagonal of the rhombic system due to the bending of the cantilever spring, it follows that this is proportional to the applied load P. The component of the force acting along the member ED elongates it causing a vertical motion DD' of the end of the system of springs which is proportional to the applied load P. This causes an additional displacement AA' of the end of the diagonal toward the center of the system since the angle $a$ is constant and AA' is equal to DD' times the tangent of the constant angle $a$ and DD' is proportional to the load. Hence, it may be concluded that for the small ranges of deflection that the system of springs is designed to produce deflection along the diagonal of the rhombic system of springs is proportional to the applied load since each of its parts is proportional to the applied load. It should be noted that the range of deflections in a preferred embodiment of the device is twenty-thousandths of an inch over a two-inch length, making the maximum variation of the moment arm of the order of 1%. In addition, the variation in the angle $a$ due to bending has the effect of cancelling out this small error.

A similar analysis will indicate that the deflection of the system when it is loaded across the eyebolts 9 is also proportion to the applied load and the device is indeed a cantilever spring force measuring device with all of the inherent advantages thereof. Moreover, it has a linear load deflection relationship which may be readily measured with a simple displacement indicating device such as a simple, inexpensive and sensitive dial displacement indicator, which may be calibrated linearly in terms of force units, or in terms of units of deflection which may be translated into units of force, as desired. By proper selection of the angle $a$ two convenient ranges of operation may be had in the instrument, i.e., a range of operation corresponding to the loading across each diagonal of the rhombic system. The required section for the cantilever beams may be computed from the well known beam formulas to yield a device having the desired capacity.

It has been stated that the device is inherently compact. As an indication of this, it has been found in practice that a unit weighing one and one-half pounds and having overall dimensions of 4×1×2½ inches is capable of weighing up to 3000 pounds. The single unit construction makes for excellent durability and reliability of calibration; and the lack of mechanical linkages and gear trains makes the device free from the problems that plague other force measuring devices. The method of mounting the displacement indicating device permits easy adjustment of the device to zero.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

What I claim as my invention is:

1. A force measuring device comprising a rhombic elastic member with reinforced corners and a diagonal member integral therewith, said diagonal member being provided with axially aligned sections which are in spaced apart relationship to define a slot to permit a displacement of the ends of said diagonal member toward each other and provided with a captivated screw which will limit the separability of the ends of the diagonal member, eyeholes provided at the ends of the diagonals whereby a force may be applied along the diagonals of said rhombic system of cantilever beams to cause a deflection along one diagonal of said system of cantilever springs, a dial displacement indicator located across said slot in said diagonal member whereby the displacement along said diagonal is indicated on said dial indicator, whereby the force applied to the ends of the diagonal of said rhombic system of cantilever springs is determined.

2. A force measuring device comprising, in combination, an elastic member having a rhombic conformation, means for applying loads at opposite corners of said elastic member, the corners of said member being integrally connected, the said elastic member being provided with a diagonal member, said diagonal member having axially aligned sections which are in spaced apart relationship to define a slot permitting deflection of said diagonal member upon the application of said loads, the said diagonal member also being provided with adjustable means for limiting its deflection, and deflection indicating means having a sensing member cooperating with the deflection of said diagonal member, whereby the magnitudes of the said loads may be determined.

3. A device according to claim 2, the said adjustable means for limiting deflection of the diagonal member comprising a screw extending across the said slot and threadedly engaged with one section of said diagonal member on one side of said slot, the head of said screw being movably secured within the section of said diagonal member on the other side of said slot.

4. A device according to claim 3, the said section of said diagonal member on the other side of said slot being provided with an anvil projecting from the face of said portion of said diagonal member, the said anvil being contactable with the sensing member of said deflection indicating means, the said deflection indicating means being secured upon that section of the diagonal member which is threadedly engaged with said screw.

References Cited in the file of this patent

UNITED STATES PATENTS

| | | |
|---|---|---|
| 1,614,354 | Faber | Jan. 11, 1927 |
| 2,421,222 | Schaevitz | May 27, 1947 |
| 2,520,923 | Franzel et al. | Sept. 5, 1950 |
| 2,918,816 | Ormond | Dec. 29, 1959 |
| 2,986,931 | Ormond | June 6, 1961 |